3,555,382
CAPACITOR MOTOR

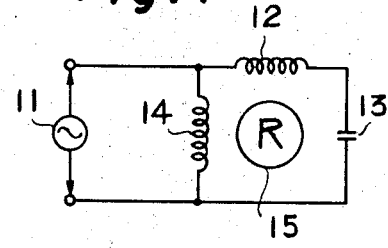
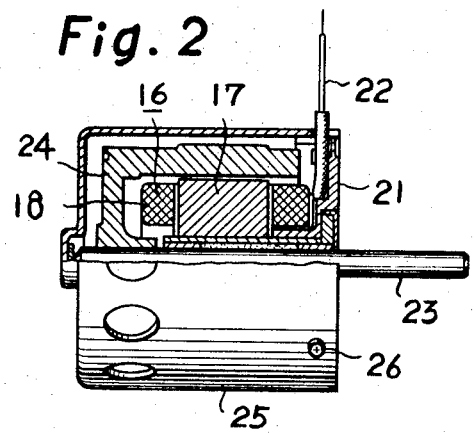
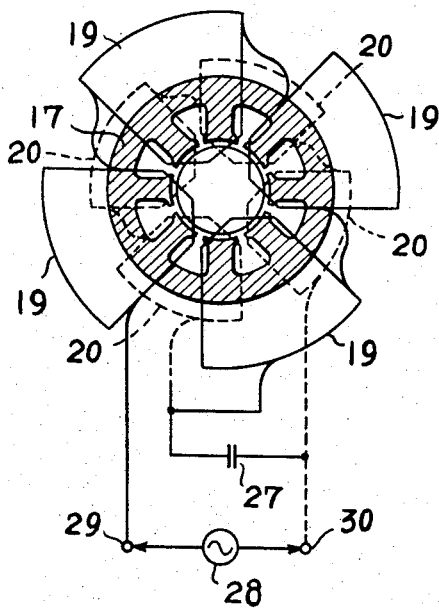
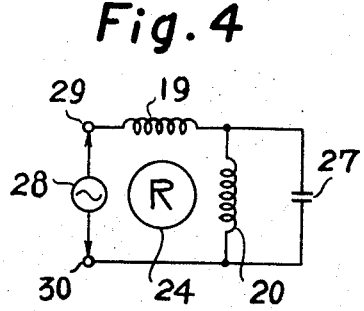

Takao Miyasaka and Hidekazu Shimizu, Yokohama, Japan, assignors to Victor Company of Japan, Limited, Yokohama, Japan, a corporation of Japan
Filed May 17, 1968, Ser. No. 730,148
Claims priority, application Japan, May 19, 1967, 42/31,880
Int. Cl. H02p 1/40
U.S. Cl. 318—221
1 Claim

ABSTRACT OF THE DISCLOSURE

A capacitor motor comprising a stator, a phase splitting capacitor and a rotor in which the stator consists of a core and main and auxiliary windings extending therearound. The main and auxiliary windings are connected in series and further the capacitor is connected in parallel with the auxiliary winding to generate a rotating magnetic field in the stator for rotating the rotor.

BACKGROUND OF THE INVENTION

This invention relates to a capacitor motor, and more particularly to an improvement in the reduction in size of a motor of this type.

A conventional capacitor motor has an auxiliary winding which is connected in series with a phase splitting capacitor. Furthermore, in relation to an A.C. power source, the main winding of the motor is connected in parallel with the series connection circuit.

The number of the turns of the main winding is determined from the following formula:

$$Nm = \frac{(0.85 \sim 0.95)V}{4.44 f \Phi} \quad (\text{I})$$

wherein $Nm$ represents the number of turns of the main winding, $V$ the voltage of A.C. power source, $f$ the frequency of the power source and $\Phi$ the magnetic flux of each of the poles.

The magnetic flux $\Phi$ of each pole is determined as follows:

$$\Phi = B\tau l \quad (\text{II})$$

wherein $B$ represents the magnetic flux density, $\tau$ the pole pitch and $l$ the thickness of the stator wall.

The pole pitch and the stator wall thickness are represented by the following respective formulae:

$$\tau = \frac{\pi D}{P} \quad (\text{III})$$

$$l = (0.5 \sim 0.95)D \quad (\text{IV})$$

wherein $P$ denotes the number of poles and $D$ represents the inner diameter of the stator.

Therefore, the algebraical incorporation of the formulae II, III and IV into the Formula I results in obtaining the number of the turns of the main winding:

$$Nm = \frac{(0.85 \sim 0.95) V \cdot P}{4.44 f (0.5 \sim 0.95) \pi D^2} \quad (\text{V})$$

Also, the number of turns of the auxiliary winding $Ns$ is represented by the following formula:

$$Ns = (1.2 \sim 1.5) Nm \quad (\text{VI})$$

Now, if one wishes to obtain a small-sized capacitor motor which is designed for use an A.C. source of unchanged voltage and which would satisfy the above Formulae V and VI, or in other words, if one tries to provide a capacitor motor having a stator whose diameter is one half that of the stator of a size of motor of the same kind, the resultant motor will have main and auxiliary windings, the turns of which are increased in number to four times the number of the turns of the main and auxiliary windings in the mentioned size of capacitor motor. That is to say, the number of turns of windings is in inverse proportion to the square of the inner diameter $D$ of the stator.

As such, if a capacitor motor is reduced in size while the voltage of the power source is unchanged, the turns of the main and auxiliary windings increase in number and also the stator is naturally reduced in size and thus its windows are of reduced area. This means the windings are formed of a wire of reduced diameter. For this reason, it is desired to produce a motor of such small size that the wire would be almost too fine to be suitable for a usual winding operation, the winding of such a fine wire which is the major part of the manufacture of a motor requires increased time. Furthermore, the winding of such a fine wire is apt to be subject to wire breakage which results in an increase in the ratio of a product of inferior quality. This will render the product a remarkably higher price and the finer the wire, the higher the cost thereof. In view of this, it is economical to utilize a wire as thick as possible for the same quantity of copper used.

On the other hand, a motor utilizing windings of a larger diameter wire but of a reduced number of turns is not satisfactory from the view point of characteristics. This means that the resultant motor is unnecessarily increased both in capacity and dimensions and it has heretofore been difficult to produce a small-sized motor of the type described.

SUMMARY OF THE INVENTION

The present invention contemplates the elimination of the above described drawbacks and difficulties accompanied with the capacitor motor by arranging the main and auxiliary windings and phase splitting capacitor in a manner to be later described and the primary object is to provide a small-sized capacitor motor.

A further object of the present invention is to provide a capacitor motor whose windings may be produced in an improved operation.

It is a still further object of the invention to provide a capacitor motor having windings of a decreased number of turns.

It is a still further object of the invention to provide a capacitor motor having windings of the wire which is larger, in diameter, than those used in a conventional motor of this kind.

The above and other objects and features will be made apparent from the following description in conjunction with the accompanying drawings wherein:

BRIEF DESCRIPTION OF THE DRAWINGS

FIG. 1 is a diagrammatic view of the arrangement of the various parts in a conventional capacitor motor, FIG. 2 is a side view of an example of the present capacitor motor with a part thereof being broken away to show in longitudinal section the inner structure thereof, FIG. 3 is a diagrammatic view showing the arrangement of the main and auxiliary windings of the motor illustrated in FIG. 2 and FIG. 4 is a diagrammatic view of the arrangement in the motor shown in FIGS. 2 and 3.

DESCRIPTION OF THE PREFERRED EMBODIMENT

As shown in FIG. 1, the conventional capacitor motor is such that, in relation to an A.C. source 11, a main winding 14 is connected in parallel to a circuit in which an auxiliary winding 12 and a phase splitting capacitor 13 are connected in series for providing a rotating magnetic field for a rotor 15. This arrangement of the conventional capacitor motor possesses the drawbacks above described.

The capacitor motor of the present invention shown in FIG. 2 is of an outer rotor type having a rotor 24 rotatable around a stator 16. The stator 16 has an iron core 17 around which extends a coil assembly 18 defined by a main winding 19 and an auxiliary winding 20. The auxiliary winding 20 is displaced in space with respect to the main winding 19 by an angle of 90 electrical degrees and a lead wire 22 extends from the coil assembly 18. The rotor 24 has an opening at one end and is rigidly mounted on and adapted to rotate with a shaft 23 received in and extending through bearings. The rotor 24 is mounted within a motor casing 25 so that an annular space is provided between the rotor and casing. The stator 16 etc. are mounted onto a support member 21 of an electrical insulating material which in turn is fastened to the motor casing 25 by means of a plurality of screws 26.

The capacitor motor of the present invention has a phase splitting capacitor 27 as shown in FIGS. 3 and 4 and numeral 28 denotes the A.C. source. It will be apparent that the main winding 19 is connected in series to the auxiliary winding 20 and the capacitor 27 in parallel to the auxiliary winding 20.

When the A.C. source 28 is connected to terminals 29 and 30, the main winding 19 is supplied with two kinds of currents, namely, one which is adapted to flow through the auxiliary winding 20 and the other has its phase in advancement of that of the first current and adapted to flow through the phase splitting capacitor 27. Thus, the currents flowing through the main winding 19 have a phase advanced of the phase of the current passing through the auxiliary winding 20, resulting in phase splitting.

Hence, when the main winding 19 and the auxiliary winding 20 are arranged on the stator at an angle of 90 electrical degrees so that the exciting currents flowing to the windings 19 and 20 have phase difference of 90 degrees therebetween and the absolute values of their ampere turns are equal, a complete rotating magnetic field is generated in the stator.

Now, assuming that the terminal voltage is regarded as a standard, a current lag behind the terminal voltage flows through the auxiliary winding 20 while a current in advance of the terminal voltage by 90 electrical degrees flows through the phase splitting capacitor 27, so that a current in advance of the terminal voltage flows through the winding 19, which is the total of the vectors of the first and second two currents. The phase of the current flowing through the main winding 19 depends on the capacity of the phase splitting capacitor 27 and, by appropriately determining the capacity thereof, it is possible to advance the phase of this current by 90 electrical degrees from the phase of the current flowing through the auxiliary winding 20. In this case, while it is not always possible to equalize the absolute values of the currents flowing through both windings, it is necessary to equalize the ampere turns thereof by appropriately selecting the turn ratio of the main winding relative to the auxiliary winding.

As described, the present invention proposes that the main winding 19 and the auxiliary winding 20 connected in series and the number of the turns of the main and auxiliary windings 19 and 20 may be determined so that the number of turns as calculated from the above Formula V equals the total of the number of the turns of the main and auxiliary windings 19 and 20, with the ampere turns of the main winding 19 equal in absolute value to the ampere turns of the auxiliary winding 20 and a phase difference of 90 electrical degrees existing between the currents of both windings.

A practical example of the present capacitor motor is illustrated below:

Outer diameter of stator core—30 mm.$^\phi$
Thickness of stator core—16 mm.
Main winding—0.11 mm.$^\phi \times 570^T \times 4^{coils}$
Auxiliary winding—0.10 mm.$^\phi \times 690^T \times 4^{coils}$
Turn ratio—1.2
Phase splitting capacitor:
    50 Hz. 100 v.—4.0 f.
    60 Hz. 100 v.—3.5 f.
    Withstand voltage above 100 v.
Temperature rise—37° C. (as measured by resistance thermometer in no-load condition)
Maximum torque—110 gr.-cm.
Starting torque—80 gr.-cm.

In order to obtain the same output as that obtainable from the motor of the present invention, it is required for a conventional capacitor motor to be designed as follows:

Main winding—0.07 mm.$^\phi \times 1500^T \times 4^{coils}$
Auxiliary winding—0.06 mm.$^\phi \times 1860^T \times 4^{coils}$
Phase splitting capacitor:
    50 Hz. 100 v.—2.0 $\mu$f.
    60 Hz. 100 v.—1.5 $\mu$f.
    Withstand voltage above 160 v.

It is, however, an obvious matter to those skilled in the art that windings utilizing the fine copper wires of 0.07 mm.$^\phi$ or of 0.06 mm.$^\phi$ should have an increased number of turns, and apt to be subject to wire breakage and other accidents and, thus are not practical for mass production.

With the present invention, a reduction of the number of turns is possible by utilizing a wire of a diameter affording the wire sufficient workability. It is also possible to use a wire of larger thickness even when the window area of the stator around which the wire is to be wound is the same as that of a stator of conventional motor. This facilitates the winding operation and the like of the wire. Furthermore, the principle of the invention avoids the possibility that the use of unnecessarily thicker wire from the consideration of the workability of the wire to be used will result in a motor of unexpectedly larger capacity and dimensions. The present invention also has an economical advantage in that thicker wire is cheaper than thinner wire of the same weight.

What is claimed is:

1. In a capacitor motor, a casing, a support of insulating material secured to the casing, a stator within the casing and mounted upon said support, said stator including a core, means connecting said main and auxiliary windings in series, said auxiliary winding being displaced in space by an angle of 90 electrical degrees from the main winding, a rotor located within the casing and rotatable about the outside of the stator, a phase splitting capacitor, means connecting said capacitor in parallel with the auxiliary winding, said capacitor having a capacity of such value that the currents flowing through the main and auxiliary windings have a phase difference of 90 electrical degrees, and the turn ratio of the main winding with respect to the auxiliary winding being of such value that the ampere turns of the main winding are equal in absolute value to the ampere turns of the auxiliary winding.

References Cited

UNITED STATES PATENTS

| | | | |
|---|---|---|---|
| 2,606,311 | 8/1952 | Burian | 318—220 |
| 3,027,471 | 3/1962 | Burgwin et al. | 310—67X |

ORIS L. RADER, Primary Examiner

G. Z. RUBINSON, Assistant Examiner

U.S. Cl. X.R.

310—67